United States Patent
Herman

(10) Patent No.: US 9,765,907 B1
(45) Date of Patent: Sep. 19, 2017

(54) ANCHOR

(71) Applicant: Joel Duane Herman, Thurmont, MD (US)

(72) Inventor: Joel Duane Herman, Thurmont, MD (US)

( * ) Notice: Subject to any disclaimer, the term of this patent is extended or adjusted under 35 U.S.C. 154(b) by 0 days.

(21) Appl. No.: 15/281,675

(22) Filed: Sep. 30, 2016

Related U.S. Application Data

(60) Provisional application No. 62/348,309, filed on Jun. 10, 2016.

(51) Int. Cl.
*F16L 3/08* (2006.01)
*E04F 11/18* (2006.01)
*F16L 3/12* (2006.01)

(52) U.S. Cl.
CPC .............. *F16L 3/12* (2013.01); *E04F 11/1804* (2013.01); *E04F 11/1808* (2013.01); *E04F 2011/1885* (2013.01)

(58) Field of Classification Search
CPC ...... E04F 11/18; E04F 11/1808; E04H 17/08; E04H 17/10
USPC ............... 267/74; 52/699, 223.13; 24/68 D, 24/265 R; 114/215; 411/14.5; 256/39, 256/47
See application file for complete search history.

(56) References Cited

U.S. PATENT DOCUMENTS

| | | | |
|---|---|---|---|
| 10,781 A | 4/1854 | Coons | |
| 529,374 A * | 11/1894 | Fitzgerald | E04H 17/08 254/231 |
| 890,468 A | 6/1908 | Sutherland | |
| 1,517,119 A | 5/1921 | Luhring | |
| 1,664,321 A | 3/1928 | Quist | |
| 1,857,435 A | 5/1932 | Cole | |
| 2,315,516 A | 4/1943 | Gray | |
| 2,576,003 A * | 11/1951 | Dry | F01M 11/0004 269/224 |
| D174,201 S | 3/1955 | Tedaldi et al. | |
| 3,717,327 A | 2/1973 | Schmidt et al. | |
| 3,720,401 A | 3/1973 | Loch et al. | |
| 3,921,960 A | 11/1975 | Bright | |
| 4,003,553 A | 1/1977 | Morris | |
| 4,048,776 A | 9/1977 | Sato | |
| 4,146,212 A | 3/1979 | Lermer | |
| 4,827,683 A | 5/1989 | Poole | |
| 4,882,891 A | 11/1989 | Sero et al. | |

(Continued)

FOREIGN PATENT DOCUMENTS

| CA | 2878342 | 1/2014 |
|---|---|---|
| CA | 2894334 | 12/2015 |

(Continued)

*Primary Examiner* — Jack W Lavinder
(74) *Attorney, Agent, or Firm* — Leveque IP Law, P.C.

(57) ABSTRACT

An anchor for a cable or rod includes a ferrule or other spring stop, to which one or more springs or arms are coupled. The spring stop may be attached to an end or other region of the cable to enable the cable to be tensioned against a support structure. The one or more springs or arms may be, for example, one or more coil springs, one or more conical coil springs, two or more cantilever springs, or one more arms. The anchor is twisted or pushed through a hole in the support structure from a first side to a second side and contacts the surface of the second side. A ferrule spring stop may be swaged to the cable or rod.

8 Claims, 8 Drawing Sheets

(56) References Cited

U.S. PATENT DOCUMENTS

| | | |
|---|---|---|
| 5,586,423 A | 12/1996 | Mullen |
| 5,755,431 A | 5/1998 | Williams |
| 5,975,793 A | 11/1999 | Simmons et al. |
| 6,053,281 A | 4/2000 | Murray |
| 6,135,424 A | 10/2000 | Bracke |
| 6,213,452 B1 | 4/2001 | Pettit et al. |
| 6,270,057 B1 | 8/2001 | Highley et al. |
| 6,336,623 B1 | 1/2002 | McCarthy |
| 6,666,625 B2 | 12/2003 | Thornton |
| 6,902,151 B1 | 6/2005 | Nilsson |
| 7,048,090 B2 | 5/2006 | Dean et al. |
| 7,063,186 B1 | 6/2006 | Granke |
| 7,198,253 B2 | 4/2007 | Striebel et al. |
| 7,306,203 B2 | 12/2007 | Platt |
| 7,325,788 B1 | 2/2008 | Stanek et al. |
| D567,397 S | 4/2008 | Terada et al. |
| 7,530,550 B2 | 5/2009 | Fattori |
| 7,568,679 B2 | 8/2009 | Neusch |
| 7,802,351 B2 | 9/2010 | McGinness et al. |
| 7,802,773 B2 | 9/2010 | Murphy |
| 8,117,798 B2 | 2/2012 | Bergman |
| D697,233 S | 1/2014 | Herman |
| D697,732 S | 1/2014 | Herman |
| D698,042 S | 1/2014 | Herman |
| 8,814,145 B2 | 8/2014 | Herman |
| 9,126,289 B2 | 9/2015 | Herman |
| 9,145,705 B2 | 9/2015 | Herman |
| 2003/0155566 A1 | 8/2003 | Sax et al. |
| 2004/0026679 A1 | 2/2004 | Terrels et al. |
| 2005/0207838 A1 | 9/2005 | Striebel et al. |
| 2006/0022189 A1 | 2/2006 | Collins |
| 2006/0091371 A1 | 5/2006 | Cox et al. |
| 2006/0140718 A1 | 6/2006 | Lamore |
| 2006/0145131 A1 | 7/2006 | Purvis |
| 2006/0151760 A1 | 7/2006 | Vyvyan-Vivian |
| 2008/0079308 A1 | 4/2008 | Kretschmer |
| 2008/0157046 A1 | 7/2008 | Murphy |
| 2008/0222873 A1 | 9/2008 | Draht et al. |
| 2008/0272353 A1 | 11/2008 | Fattori |
| 2009/0050865 A1 | 2/2009 | Napier |
| 2009/0315007 A1 | 12/2009 | Cox et al. |
| 2010/0301297 A1 | 12/2010 | Chapman |
| 2010/0308293 A1 | 12/2010 | Larkins et al. |
| 2014/0008596 A1 | 1/2014 | Herman |
| 2014/0008597 A1 | 1/2014 | Herman |
| 2014/0299829 A1 | 10/2014 | Herman |
| 2015/0308148 A1 | 10/2015 | Herman |
| 2016/0083975 A1 | 3/2016 | Herman |

FOREIGN PATENT DOCUMENTS

| | | |
|---|---|---|
| JP | 02-24447 | 1/1990 |
| WO | WO96/29490 | 9/1996 |
| WO | WO 2014/008340 | 1/2014 |

\* cited by examiner

ANCHOR

PRIORITY CLAIM

This application claims the benefit to U.S. Provisional Patent Application No. 62/348,309 filed Jun. 10, 2016 which is hereby incorporated herein by reference.

BACKGROUND

Cable railings are becoming increasingly popular. Commonly, the railings are placed in tension between support posts, walls or other support structures. The cables ends must be securely anchored to the support structure to resist the tension.

When the support structure is a solid material of sufficient thickness, such as a 4"×4" wood post, for example, a lag bolt or the like may be used as an anchor. However, when the support structure is thin other anchor types must be used.

For a support structure, such as a thin-walled support structure, it is preferable that an anchor be easily installable when only external access to the support structure is available. Further, an anchor should be inexpensive.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
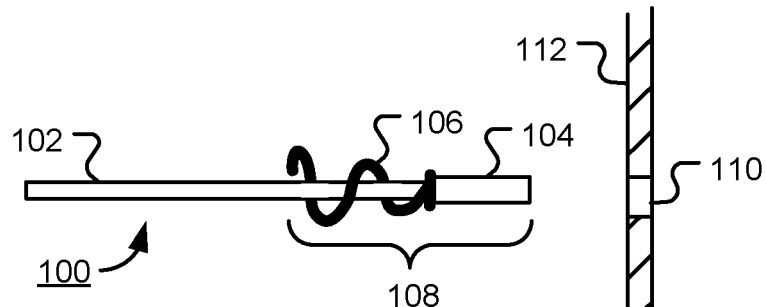
FIG. 1 is a diagrammatic representation of a cable anchor prior to installation, consistent with certain embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Various embodiments described herein relate to a cable anchor. The anchor is described as used for anchoring a cable railing, but the anchor may be used in other applications. For example, the anchor may be used with suspension cables for supporting objects from a ceiling.

The present disclosure relates to an anchor for coupling a component of a cable railing system to a support structure through a hole in the support structure. The component may be a cable, a rod, or a cable fitting, for example. In some embodiments the anchor includes a spring element and a ferrule for attaching the spring element to the component. The spring element has a first region and a second region, where the second region comprises a coil spring. The ferrule is configured to couple the first region of the spring element to the component of the cable railing system. The anchor is configured to couple the component through a hole in a support structure, where a cross dimension of the hole is greater than a cross dimension of the ferrule and less than a diameter of the coil spring. The ferrule is configured for attachment to the cable via swaging.

The anchor may also include one or more second spring elements also coupled to the cable by the ferrule.

The coil spring may have a conical profile, a cylindrical profile, or some other profile.

In some embodiments, the spring element has a third region, where the second region is located between the first and third regions. The third region may be a coil configured as a grommet, for example, that is sized to fit at least partially within the hole. Alternatively, the third region of the first spring element may comprise a tab adapted to facilitate insertion of the anchor through a hole.

A further embodiment of the disclosure relates to an anchor for a cable or rod. The anchor includes a ferrule and one or more cantilever springs. Each cantilever spring has a first end and a second end, where the first ends of the one or more cantilever springs are coupled to the ferrule and where the ferrule is sized for attachment to the cable or rod.

An exemplary embodiment is shown in FIG. 1. A cable assembly 100 includes cable 102, spring stop 104 and spring element 106. In the embodiment shown, the spring stop 104 comprises a ferrule that is attached to a region of the cable 102 and couples spring element 106 to the cable. A first region of the coil spring is held within the ferrule 104, while a second region, comprising a conical coil spring in this embodiment, is visible. Cable anchor 108 is provided by the combination of ferrule 104 and spring element 106. The cable may be a single or multi-strand wire rope, for example. The anchor may also be used to couple other components of a cable railing system, such as a tensioner for example, to a support structure. The coil spring of spring element 106 may have a conical profile, as shown in the figure, or some other profile. In the sequel, spring stop 104 is generally referred to as a ferrule. However, it is to be understood that the disclosed anchor is not limited to the use of a ferrule and that other kinds of spring stops may be used without departing from the present disclosure.

Ferrule 104 may be attached to an end of cable 102 and provide an end stop. Alternatively, the ferrule may be attached to another location, part way along the cable. In one embodiment, ferrule 104 is a metal ferrule that is swaged down to a ¼" diameter and attached to a cable having a diameter in the range ⅛" to 3/16", for example. Other sizes may be used without departing from the present disclosure.

In use, cable anchor 108 is passed through hole 110 in support surface or structure 112. The hole 110 is sized to allow passage of ferrule 104.

In one embodiment, where the spring element 106 comprises a conical coil spring, the inside diameter (I.D.) of conical coil spring at the smaller end of the conical coil spring, is slightly greater than the diameter of the cable, and the outside diameter (O.D.) of the spring is slightly less than the diameter of hole 110. The diameter of conical coil spring 106 at the larger end is greater than that of the hole 110. For example, the diameter may be ⅜" or greater for a ¼" diameter hole.

In one embodiment, a ferrule is swaged down to 0.25" diameter on a 3/16" (0.1875") diameter cable and couples a spring element to the cable. The assembly may be passed through a hole with diameter of 17/64" (0.265625"), for example, in a support structure. The second region of the spring element has a diameter greater than 17/64" (0.265625") to prevent the anchor from being pulled back through the hole. The spring element may have a wire diameter of 0.029" and may be constructed of 316 grade stainless steel, for example. Thus, the ferrule may pass through the hole. Also, the cable and a length of spring may pass through the hole. However, a coil of spring element is too large to pass through the hole.

In a further embodiment, a ferrule is swaged down to 0.25" diameter on a ⅛" (0.125") diameter cable and couples a spring element to the cable. The assembly may be passed through a hole with diameter of ¹⁷⁄₆₄" (0.265625"), for example, in a support structure. The second region of the spring element has a diameter greater than ¹⁷⁄₆₄" (0.265625") to prevent the anchor from being pulled back through the hole.

In a still further embodiment, a ferrule is swaged down to 0.375" diameter on a ¼" (0.25") diameter cable and couples a spring element to the cable. The assembly may be passed through a hole with diameter of ²⁵⁄₆₄" (0.390625"), for example, in a support structure. The second region of the spring element has a diameter greater than ²⁵⁄₆₄" (0.390625") to prevent the anchor from being pulled back through the hole.

The dimensions in the examples above are approximate and may, of course, be varied. However, from these examples, it will be clear to those of ordinary skill in the art how the components of an anchor and a corresponding hole in a support structure may be sized relative to one another for use with a cable of any given diameter.

The coils of coil spring of element 106 are spaced such that the anchor 108 can be wound or screwed into the hole 110 in the support surface 112. The number of coils and spring rate may be selected depending upon the application.

Spring element 106 and ferrule 104 may be constructed from a variety of materials. For example, stainless steel or phosphorus bronze may be used depending on the environment where the anchor is installed. Cheaper materials, such as piano wire for example, may be used for interior applications.

While the embodiment in FIG. 1 shows spring element 106 as including a conical coil spring, a non-conical coil spring, such as a cylindrical coil spring for example, may be used in other embodiments without departing from the present disclosure.

Figure 2:
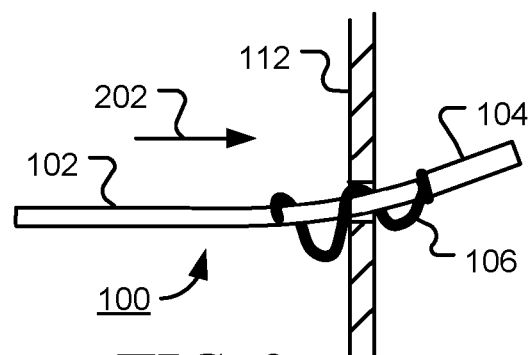
FIG. 2 is a diagrammatic representation of a cable anchor during installation, consistent with certain embodiments.

FIG. 2 shows the anchor located part way into the hole. Cable 102 flexes towards the region of spring element 106 within the hole. The hole, spring and cable should be sized to allow the spring and cable to pass through the hole. The anchor 108 is rotated in the hole so that the conical coil spring of spring element 106 draws the anchor in the direction of arrow 202.

Figure 3:
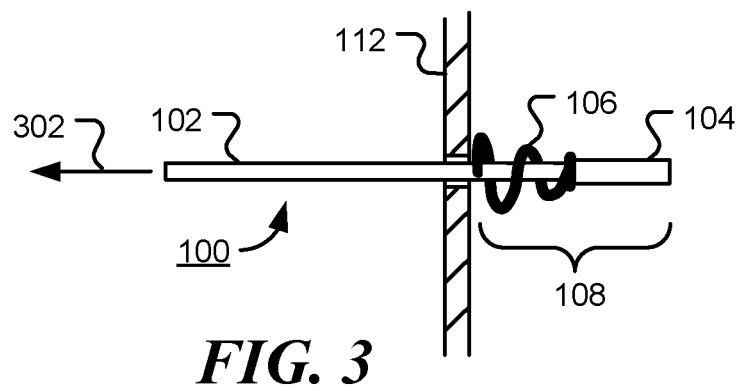
FIG. 3 is a diagrammatic representation of a cable anchor after installation, consistent with certain embodiments.

FIG. 3 shows the installed anchor. When tension is applied to cable 102 in the direction of arrow 302, the conical coil spring of spring element 106 is compressed and resists the tension. In one embodiment, when the applied tension exceeds a limit of the spring, the coil spring is compressed until the coils of the spring contact one another and the spring can be compressed no further. The coil spring may become lodged into the gap between the ferrule and the support structure. The cross-sectional shape of the spring wire of spring element 106 and the pitch of the coil spring may be selected to ensure that the spring lays flat when fully compressed.

The coil spring of spring element 106 serves to deflect the ferrule 104, such that end edge of the ferrule contacts the periphery of hole 110 in support surface 112 when tension is applied to cable 102.

The spring element 106 may be attached to a cable or other component at a first region of the spring element, while the coil spring provides a second region of the spring element. Thus, in the embodiment shown, spring element 106 has a first region that contacts the ferrule 104 and second region that contacts the support surface 112, the second region comprising a coil spring, the spring element sized to receive an end of the cable or other component.

The ferrule 104 provides a spring stop that is configured to couple to the component and to contact the first region of the spring element 106, thereby preventing motion of the spring element along the component in a first direction. It will be apparent to those of ordinary skill in the art that motion of the spring element may be prevent by other types of spring stops. For example, a collar or other element may be attached to the cable by welding, clamping, adhesive, epoxy, crimping etc. The spring stop is sized to pass through the hole 110 in support surface 112.

The attachment 104 prevents the spring element 106 from sliding along the cable 102 when tension is applied in the direction of arrow 302. The spring element 104 may or may not be coupled to the cable via attachment 104. For example, attachment 104 may serve as a stop.

In order to aid in the installation and/or rotation of the anchor, the spring element 106 may include an extension element, such as a removable tab, attached to the larger diameter end of the conical spring 106. The extension element forms a third region of the spring element and may be removed once the anchor is inserted.

An anti-corrosion coating may be applied to the anchor. A stainless steel anchor may be subject to a passivation step.

Figure 4:
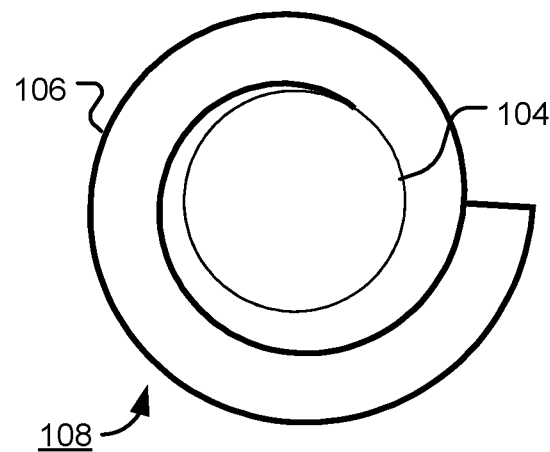
FIG. 4 is a diagrammatic representation of a cable anchor with a single conical coil spring, consistent with certain embodiments.

FIG. 4 is a diagrammatic representation of cable anchor 108 with a single conical coil spring, consistent with certain embodiments. The figure shows an end view of anchor 108. The anchor 108 includes ferrule 104 and a single conical coil spring 106.

Figure 5:
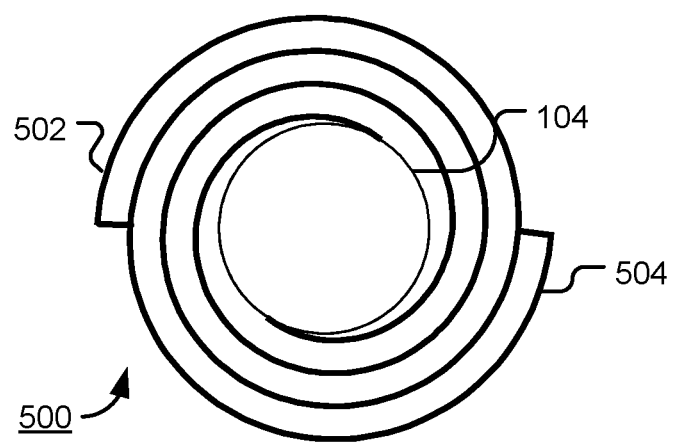
FIG. 5 is a diagrammatic representation of a cable anchor with a double conical coil spring, consistent with certain embodiments.

FIG. 5 is a diagrammatic representation of cable anchor 500 with a double conical coil spring, consistent with certain embodiments. The figure shows an end view of anchor 108. The anchor 500 includes ferrule 104, first conical coil spring 502 and second conical coil spring 504. Coil springs with profiles other than conical made be used.

Figure 6:
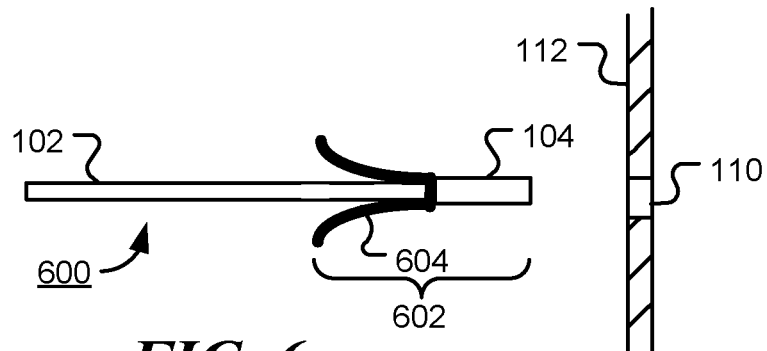
FIG. 6 is a diagrammatic representation of a cable anchor prior to installation, consistent with certain embodiments.

FIG. 6 is a diagrammatic representation of a cable anchor assembly 600 prior to installation, consistent with further embodiments. In the embodiment shown, the cable anchor 602 includes first cantilever spring 604 and second cantilever spring 606. The cable anchor 602 and ferrule 104 are attached to cable or rod 102. One or more additional cantilever springs may be incorporated. Alternatively, a single cantilever spring may be used. In one embodiment, the cantilever springs are uniformly spaced around the circumference of the ferrule. For example, two springs may be spaced 180° apart (diametrically opposite) and three springs may be located at 120° intervals around the ferrule.

Figure 7:
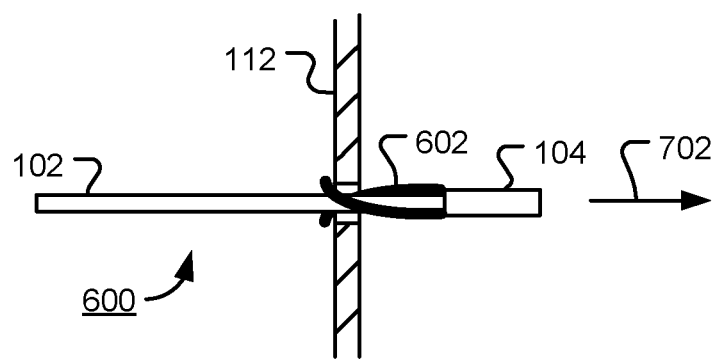
FIG. 7 is a diagrammatic representation of a cable anchor during installation, consistent with certain embodiments.

FIG. 7 is a diagrammatic representation of cable anchor assembly during installation. Cantilever springs 604 and 606 bend towards the rod or cable 102 to allow the anchor to pass through hole 110 in support structure 112 in the direction indicated by arrow 702.

Figure 8:
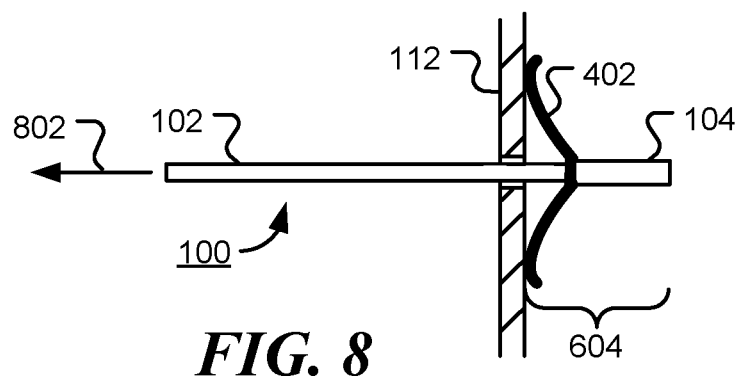
FIG. 8 is a diagrammatic representation of a cable anchor after installation, consistent with certain embodiments.

FIG. 8 is a diagrammatic representation of cable anchor assembly after installation. Cantilever springs 604 and 606 bend outwards from the rod or cable 102 to prevent the anchor 602 from pass back through hole 110 in support structure 112 when tension is applied to the rod or cable 102 in the direction of arrow 802.

Figure 9:
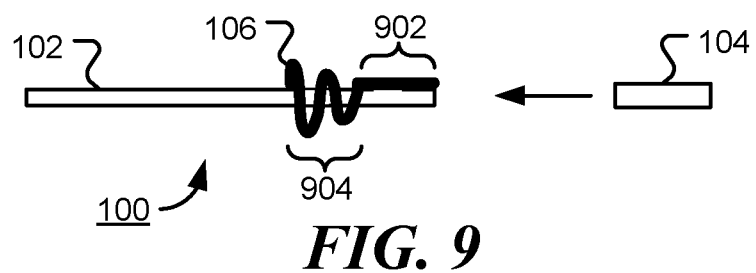
FIG. 9 is a diagram illustrating assembly of a cable anchor, consistent with certain embodiments.

FIG. 9 is a diagram illustrating assembly of a cable anchor, consistent with certain embodiments. Referring to FIG. 9, the spring element 106 has an end portion or first end region 902 that is longitudinally aligned along the cable 102. Ferrule 104 is placed over the cable 102 and the first region 902, such that the end of the cable and the first region 902 are located inside the ferrule. The ferrule is then contracted around the cable and the end portion 902 to form a cable anchor (as shown in FIG. 1, for example). A second region 904 of the spring element 106 comprises a coil spring.

The spring element may be attached to the cable by other means, without departing from the present disclosure. For example, a spiral portion of the conical coil spring may be attached to the cable without a need for a ferrule or other end stop. The attachment means should be configured to withstand the maximum tension applied to cable 102 in use.

Figure 10:
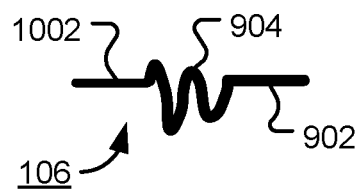
FIG. 10 is a diagrammatic representation of a cable anchor having an extension element for ease of insertion, consistent with certain embodiments.

FIG. 10 is a diagrammatic representation of a spring element of cable anchor an extension element for ease of insertion, consistent with certain embodiments. The spring element 106 comprises a first region 902, a central second region 904, and a third region 1002. In the embodiment shown, the central second region is a conical coil spring and the third region 1002 is an extension element or tab 1002. The spring element 106 may be attached to a cable or cable fitting by holding the first region 902 between the cable and a ferrule, for example, to form a cable anchor. The cable anchor may be twisted into a hole in a support structure by applying pressure to the extension element 1002 without a need for an installer to contact an end of the conical coil spring. The extension element 1002 may be configured to allow it to be removed after the cable inserted is inserted or almost inserted into the hole in the support structure. For example, the region where extension element 1002 and the conical coil spring 904 of spring element 106 are joined may be notched or crimped such that the region will fatigue and break after repeated bending. Alternatively, the extension element 1002 may remain in place after insertion of the cable anchor. In a further embodiment, the extension element is shaped, like a grommet for example, to fill the gap between the cable and the support structure so as to prevent or limited water intrusion through the hole in the support structure.

Figure 11:
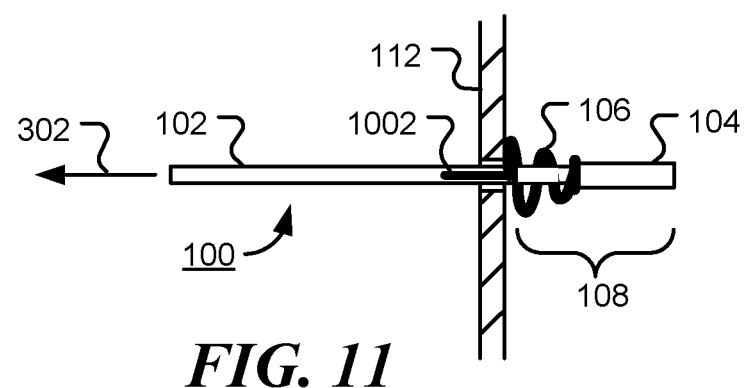
FIG. 11 is a diagrammatic representation of a cable anchor having an extension element for ease of insertion, consistent with certain embodiments.

FIG. 11 is a diagrammatic representation of a cable anchor an extension element for ease of insertion, consistent with certain embodiments. In the embodiment shown, the extension element 1002 remains in the hole in the support structure and serves to keep the conical coil spring 106 in the desired location.

Figure 12:
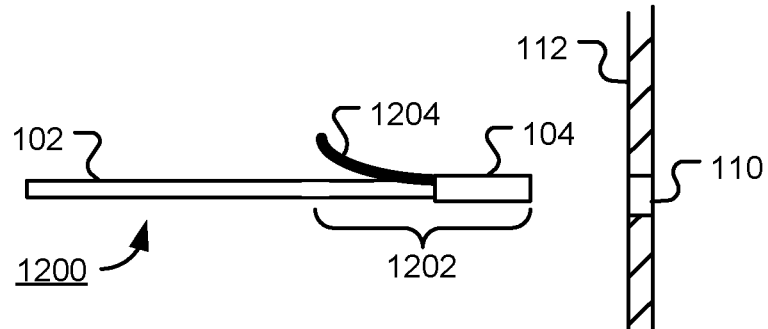
FIG. 12 is a diagrammatic representation of a cable anchor prior to installation, consistent with certain embodiments.

A further embodiment is shown in FIG. 12. A cable assembly 1200 includes cable 102, ferrule 104 attached to a region of the cable 102, and arm 1204. Cable anchor 1202 is provided by the combination of ferrule 104 and arm 1204. A portion of arm 1204 may extend into ferrule 104 and the ferrule swaged around the arm 1204 and cable 102. Arm 1204 may be constructed metal or other materials. When cable 102 is flexible, arm 1204 may be substantially rigid or more spring-like. When cable 102 is a rod, arm 1204 may have sufficient flexibility to enable insertion of the cable anchor. In use, cable anchor 1202 is passed through hole 110 in support surface 112. The hole 110 is sized to allow passage of ferrule 104.

Figure 13:
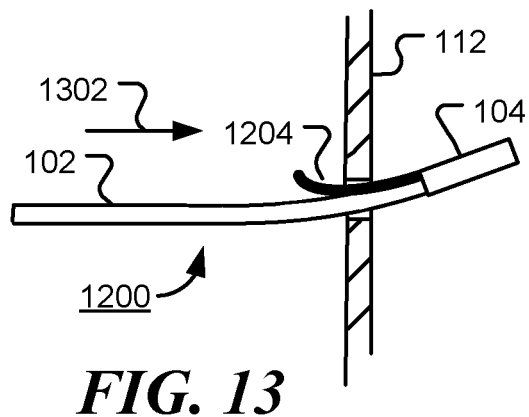
FIG. 13 is a diagrammatic representation of a cable anchor during installation, consistent with certain embodiments.

FIG. 13 shows the cable anchor located part way into the hole in support structure 112 during insertion in the direction of arrow 1302. Within the hole, cable 102 flexes towards the arm 1204 for facilitate insertion. The hole, arm and cable should be sized to allow the arm and cable to pass through the hole.

Figure 14:
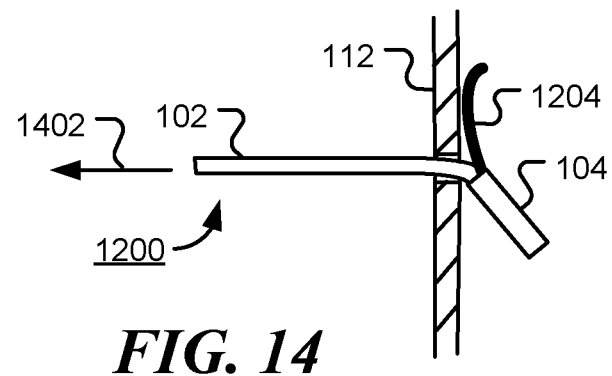
FIG. 14 is a diagrammatic representation of a cable anchor after installation, consistent with certain embodiments.

FIG. 14 shows the installed cable anchor. When tension is applied to cable 102 in the direction of arrow 1402, arm 1204 deflects ferrule 104 such that the ferrule is displaced and an end edge of the ferrule contacts the periphery of hole in support surface 112 and prevents the ferrule from passing through the hole.

Thus, the cable anchor in FIGS. 12-14 includes a ferrule, the ferrule having an interior volume sized to receive the cable. The ferrule is configured to be swaged to a first region of the cable. A single arm is shown in the figure; however, one or more additional arms may be used. The first arm has a first end region and a second end region, and is configured such that, when the first end region of the first arm is attached to the first region of the cable, the second end region of the first arm extends away from the cable. In use, the first end region of the first arm and the first region of the cable are located inside the ferrule and the ferrule is contracted around the first region of the cable and the first end region. The first end region is not visible in the figures, since it is located inside the ferrule 104. The second end region of the first arm 1204 may be straight or, as shown, curved away from the cable. The first arm may be substantially rigid or flexible.

Figure 15:
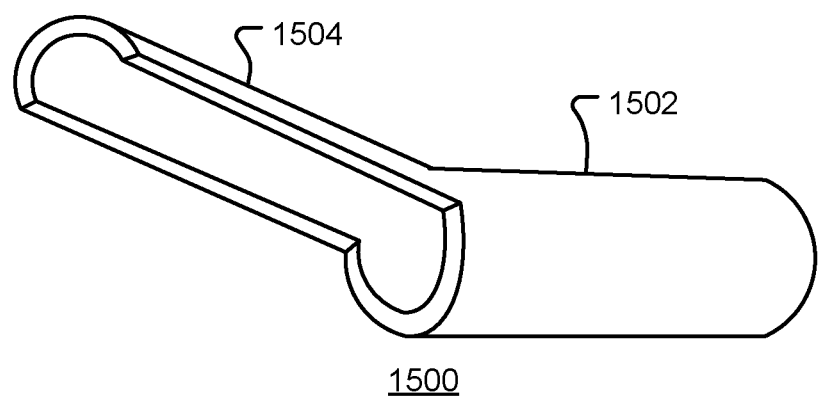
FIG. 15 is a diagrammatic representation of a cable anchor with integrated ferrule and arm, consistent with certain embodiments.

FIG. 15 shows an embodiment where the first end region of the arm may be integral with the ferrule. The cable anchor 1500 comprises a ferrule portion 1502 and an arm portion 1504. In use, a cable is inserted into the interior of ferrule region 1502 and the region is compressed or swaged around the cable. Arm portion 1504 is angled away from the central longitudinal axis of the ferrule portion 1502. Once inserted into a support structure, the arm portion deflects the ferrule portion as described above with respect to FIG. 14.

The cable anchor may be attached to one end of a cable and a cable rail fitting, such as a tensioner, may be attached to the other. For example, a short section of cable with a cable anchor may be used to attach a cable tensioner to a post or other support structure.

Alternatively, the cable anchor may be used to couple a cable rail fitting to a post or other support structure directly.

Figure 16:
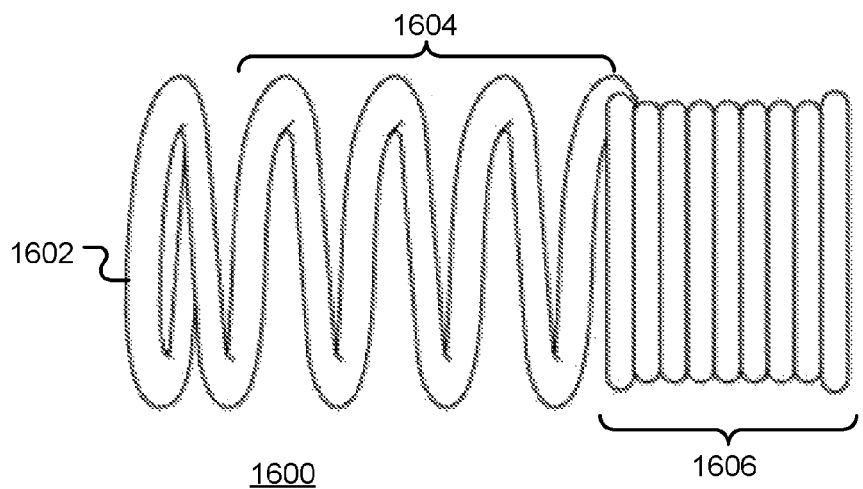
FIG. 16 is a diagrammatic representation of a spring element of a cable anchor, consistent with certain embodiments.

FIG. 16 is a diagrammatic representation of a spring element of a cable anchor, consistent with certain embodiments. Spring element 1600 includes a first region 1602, a second region 1604 and a third region 1606. The first region 1602 is coupled to a cable by a ferrule or other means and the second region 1604 comprises a coil spring designed to prevent the anchor from being pulled back through a hole in a support structure. The third region 1606 comprises a tightly wound coil spring designed to fit within the hole and act as a grommet. In an alternative embodiment, the third region may comprise a cylinder sized to fit at least partially within the hole. The dimensions and/or profile of the spring element 1600 may be varied in other embodiments. For example, first region 1602 may have a smaller diameter than second region 1604 to facilitate use with a ferrule or other spring stop.

Second region 1604 may comprise a conical coil spring, a cylindrical coil spring, a combination thereof, or a coil spring of other profile. The spring may contain one or more coils. The material of the spring may have circular, rectangular or other cross section.

Figure 17:
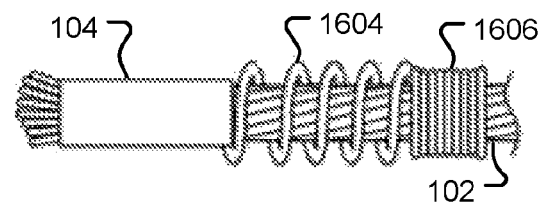
FIG. 17 is a diagrammatic representation of a cable anchor assembly with ferrule and spring element, consistent with certain embodiments.

FIG. 17 is a diagrammatic representation of a cable anchor assembly with a ferrule and spring element, consistent with certain embodiments. A first region of the spring element is held between ferrule 104 and cable 102. The second region 1604 and the third region 1606 surround cable 102.

Figure 18:
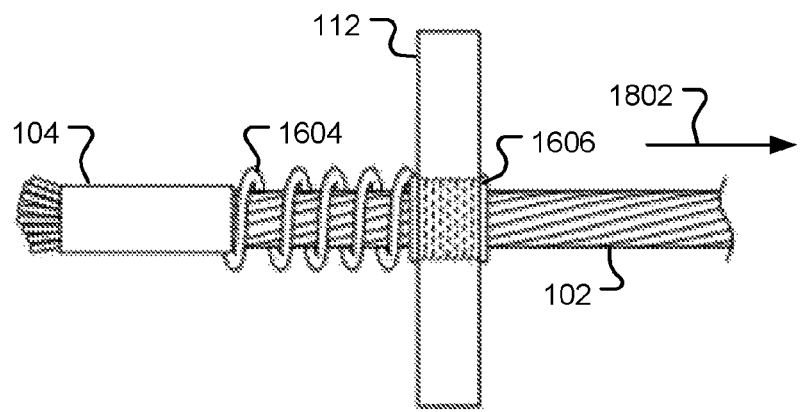
FIG. 18 is a diagrammatic representation of an installed cable anchor assembly, consistent with certain embodiments.

FIG. 18 is a diagrammatic representation of an installed cable anchor assembly, consistent with certain embodiments. Third region 1606 is located at least partially inside a hole in support structure 112. When cable 102 is tensioned in the direction of arrow 1802, the second region 1604 is compressed. The diameter of second region 1604 is greater than the diameter of the hole in support structure 112 and prevents the anchor from being pulled through the hole.

Figure 19:
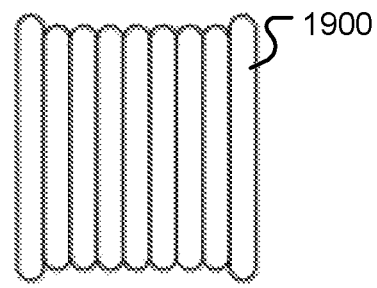
FIG. 19 is a diagrammatic representation of a grommet complementary to a cable anchor, consistent with certain embodiments.

FIG. 19 is a diagrammatic representation of a grommet complementary to a cable anchor, consistent with certain embodiments. A cable railing is anchored to some support structures, such as post, but may simply pass through other posts. Grommet 1900 and third region 1606 (shown in FIG. 16) may have matching or complementary designs and can protect a cable from sharp edges of a hole. In the embodiment shown, grommet 1900 comprises a tightly wound spring. The central portion of the spring has a slightly smaller diameter than the two ends.

Figure 20:
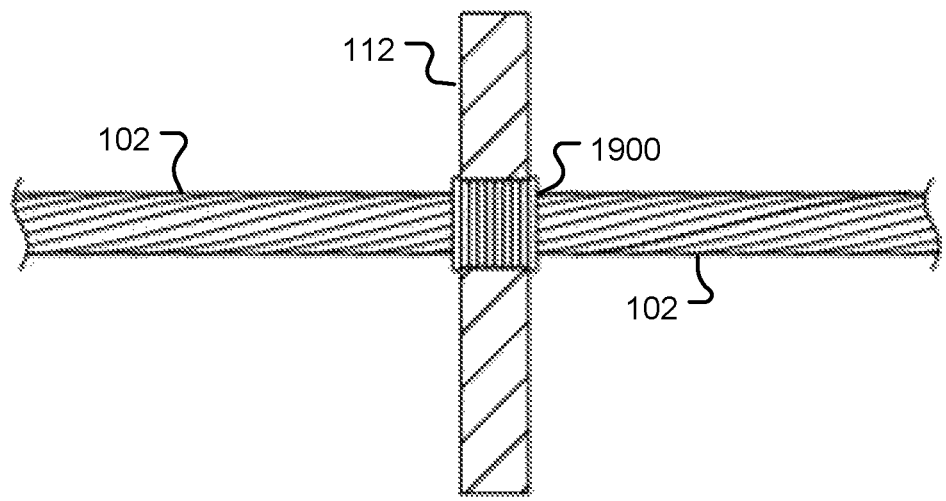
FIG. 20 is a further diagrammatic representation of an installed grommet, consistent with certain embodiments.

FIG. 20 is a further diagrammatic representation of an installed grommet, consistent with certain embodiments. Grommet 1900 is pushed or twisted in a hole in support structure 112 and cable 102 is passed through the grommet. The ends of grommet may protrude from the hole. Contact between cable 102 and support structure 112 is prevented, since grommet 1900 is located between them.

As referenced above, the cable anchor described herein may be part of a system for anchoring a cable railing. The cable anchor may include without limitation any of the embodiments described herewith.

The implementations of the present disclosure, described above, are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The present disclosure may be embodied in other specific forms without departing from its essence or fundamental characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing X includes any suitable method for causing another party such as a remote user, a remote processing resource (e.g., a server or cloud computer) or a machine to perform X. Similarly, performing steps X, Y, and Z may include any method of directing or controlling any combination of such other individuals or resources to perform steps X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An anchor comprising:
a first spring element comprising a first region and a second region, the second region comprising a coil spring, the spring element sized to receive a portion of a component; and
a spring stop, configured to couple to the component and to contact the first region of the first spring element, thereby preventing motion of the first spring element along the component in first direction, the spring stop having an exterior cross dimension smaller than a first exterior diameter of the coil spring;
whereby the anchor is configured to couple the component through a hole in a support structure for which a cross dimension of the hole is greater than the exterior cross dimension of the spring stop and less than the first exterior diameter of the coil spring,
the anchor further comprising:
a second spring element having a first region and a second region,
where the first region of the second spring element is coupled to the component by the spring stop.

2. The anchor of claim 1, where the first spring element further comprises a third region, where the second region is coupled between the first and third regions.

3. The anchor of claim 2, where the third region of the first spring element comprises a coil and where the coil of the third region is sized to fit at least partially within the hole in the support structure.

4. The anchor of claim 2, where the third region of the first spring element comprises a tab adapted to facilitate insertion of the anchor through the hole in the support structure.

5. The anchor of claim 1, wherein the spring stop comprises a ferrule configured for coupling to the component via swaging.

6. The anchor of claim 5, where, in use, the first region of the first spring element and a portion of the component are located inside the ferrule and the ferrule is contracted around the portion of the component and the first region of the first spring element.

7. The anchor of claim 1, where the second region of the first spring element comprises a conical coil spring, a cylindrical coil spring or a combination thereof.

8. The anchor of claim 1, where the component comprises a cable or a cable fitting of a cable railing system.

* * * * *